United States Patent [19]

Kemper

[11] E Re. 29,328

[45] Reissued Aug. 2, 1977

[54] TRANSMISSION DEVICE

[75] Inventor: Yves Jean Kemper, Yvelines, France

[73] Assignee: Vadetec S.A., Switzerland

[21] Appl. No.: 741,050

[22] Filed: Nov. 11, 1976

Related U.S. Patent Documents

Reissue of:

[64] Patent No.: 3,955,432
Issued: May 11, 1976
Appl. No.: 486,859
Filed: July 9, 1974

[30] Foreign Application Priority Data

July 13, 1973 France ..... 73.25788

[51] Int. Cl.[2] ..... F16H 13/06; F16H 15/50

[52] U.S. Cl. ..... 74/190; 74/63; 74/690; 74/571 R; 64/21

[58] Field of Search ..... 74/190, 190.5, 193, 74/198, 201, 200, 63, 60, 690, 571 R; 64/21

[56] References Cited

U.S. PATENT DOCUMENTS

| | | | |
|---|---|---|---|
| 1,146,982 | 7/1915 | Weiss | 74/63 |
| 1,469,061 | 9/1923 | Weiss | 74/63 |
| 1,537,515 | 5/1925 | Weiss | 74/198 |
| 1,728,383 | 9/1929 | Weiss | 74/198 |
| 2,149,668 | 3/1939 | Crosthwaite | 74/63 |
| 2,902,844 | 9/1959 | Rzeppa | 64/21 |
| 3,180,159 | 4/1965 | Girodin | 74/60 |
| 3,261,219 | 7/1966 | Kraus | 74/200 |

FOREIGN PATENT DOCUMENTS

| | | |
|---|---|---|
| 528,820 | 11/1921 | France |
| 1,332,574 | 4/1902 | France |
| 1,132,773 | 1/1963 | Germany |
| 165,137 | 6/1921 | United Kingdom |

*Primary Examiner*—Samuel Scott
*Assistant Examiner*—Allan R. Burke
*Attorney, Agent, or Firm*—Lane, Aitken, Dunner & Ziems

[57] ABSTRACT

A transmission device comprising a first rotary element having two rolling friction surfaces which are of revolution about the axis of rotation of the element, or first axis, and having a center of symmetry located on the first axis, the two surfaces of the first element each being in frictional contact at a single point with one or the other of two rolling friction surfaces which are of revolution about a common axis of rotation, or second axis, and have a center of symmetry located on said second axis, the first axis and the second axis being inclined with respect to each other at an angle a and contained in the same plane, wherein the center of symmetry of the surfaces of revolution of the first element and the center of symmetry of the surfaces of revolution which are in contact with the first element are coincident at the same point S, the two surfaces of revolution about the second axis are formed on two parts connected to rotate with each other of a second element connected to a first shaft coaxial with the second axis, the assembly formed by the two surfaces of the second element is different from a sphere, and the first element is connected to rotate with a second shaft so that the two points of contact between the first element and second element are symmetrical with respect to the common center of symmetry and therefore located on each side of the second axis and first axis.

18 Claims, 13 Drawing Figures

TRANSMISSION DEVICE

Matter enclosed in heavy brackets [ ] appears in the original patent but forms no part of this reissue specification; matter printed in italics indicates the additions made by reissue.

BACKGROUND OF THE INVENTION

This invention relates generally to power transmission and more particularly to a new and novel power transmission.

Power transmission devices are known in which a tiltable block member is driven in a conical or rotational movement for varying the speed ratio of the input and output. In some known devices the conical or rotational movement of the block is combined with other forces and elements to vary speed ratios or transmit torque.

A known device is disclosed in U.S. Pat. No. 1,728,383 to Weiss in which relatively rolling elements, one of which is mounted on a block member for conical movement, are disclosed. A wedge effect is used to maintain the rolling elements from slipping relatively for power transmission and variable control of the speed ratios of the apparatus. However, the contact forces developed are not sufficient to allow transmission of large torques. An attempt at transmission of a large torque in this type of known apparatus results in loss of energy, due to slippage and wear thereof because of this slippage with early failure.

Another known transmission is disclosed in U.S. Pat. No. 3,261,219 (Excelermatic) which discloses a block and surfaces of revolution formed on two discs which define an essentially spherical-shaped cavity and are connected to two spearate shafts. The axis of the block it laterally offset with respect to the center of symmetry of the discs so that the block has a rolling contact with the two discs at two points located on the same side of the axis of the discs at different distances from the axis of the discs.

In this latter known apparatus the power is transmitted from the first disc to the block and from the block to the second disc so that the power transmitted by the apparatus passes in succession through each one of the contact points and therefore in series so that the energy losses are relatively high.

Further axial and radial forces due to the pressure of frictional contact are transmitted to the roller bearings supporting the block and each of the discs so that these roller bearings must be of the radial-axial type and as the forces are very high the bearings must have a large dimension which results in additional energy losses.

SUMMARY OF THE INVENTION

It is a principal object to provide a power transmission that overcomes the drawbacks of the known power transmissions.

Another object is to provide a power transmission enabling the transmission of high power input torque by developing relatively simply a contact pressure between a first element and a second element while at the same time avoiding the development of axial forces on the driving shafts.

Another object is to provide a power transmission in which a torque developing the contact pressure is readily compensated so that the transmission is balanced.

The power transmission according to the invention comprises a first element having two axially spaced closed surfaces of revolution about a first axis and which define two rolling surfaces on opposite sides of a plane normal to this first axis. The plane passes through a point on the first axis. A second element is driven conically about the point on the first axis and circumferentially of the first axis. The second element likewise has two or second rolling closed surfaces of revolution about a second axis and axially spaced on opposite sides of a plane passing through the point and normal to a second axis. The second axis intersects the first axis at said point and is inclined relative to the first axis by an angle a.

Input torque means are provided having a first shaft to impart a conical movement to the second element conically about the point on the first axis and circumferentially of the first axis. The second element is configured and has a mass, and therefore has means, effective to develop a gyroscopic torque when driven. This gyroscopic torque is effective to apply paired rolling surfaces of the two elements on each other for relative rolling thereon and contacting at two areas disposed on opposite sides of both axis and effective to couple the first and second element to prevent sliding movement therebetween. Means are provided in the form of a shaft for taking out an output torque transmitted through the second element from the input torque means.

Because of the gyroscopic torque developed it is possible to hold the second element applied to the first element whatever the value or strength of the power being transmitted. However, reaction axial forces can be prevented from being applied to the shaft, since the contact pressures between the two elements produce exclusively torques that can be absorbed by the bearings supporting the radial thrusts, this makes for a light construction.

The power transmission has the advantage of increasing the transmissability of power since the two areas of contact transmits half the power transmitted since they work in parallel.

The power transmission has provision for varying the speed ratio of the input and output in dependence upon the position of the two areas relative to the first axis. This accomplished by means of provision of hydraulic fluid to a chamber that axially moves two parts constituting the first element.

The power transmission likewise provides for rotation of the second element relative to the inclined or second axis.

The surfaces of revolution about the first axis are disposed symmetrically relative to the plane normal to the first axis and the surfaces of revolution about the second axis are disposed symmetrically relative to the plane normal to the second axis in order to facilitate balancing of the gyroscopic torque.

An additional feature of the transmission is that the first element is mobile in rotation around the first axis. A mechanical coupling means, preferably gears, associated with the shafts correlate at least two of the following speeds: those of the second element around the first axis, and those of the first element around the first axis.

This particular arrangement has some specific advantages. For example in certain coupling cases, the maximum output speed is obtained for an angle a equal to 0°, which is the equivalent of a direct drive. The second element and the first element rotate at the same speed and there is no longer displacement of the two areas of contact on the rolling surfaces so that losses in rolling friction contact and wear of these surfaces are avoided, the contact occuring on two circles. Further since the gyroscopic torque varies as a function of the angle a and the speeds of the second element around the first and second axes, the coupling permits a modification of the evolution of the gyroscopic torque as a function of the output speed and therefore obtaining of available torques which are more adapted to the different modes of operation (constant torque, constant power etc.).

BRIEF DESCRIPTION OF THE DRAWINGS

Further features and advantages of the invention will be apparent from the ensuing description of some embodiments with reference to the accompanying drawings given by way of example.

In the drawings.

DESCRIPTION OF THE PREFERRED EMBODIMENTS

Figure 1:
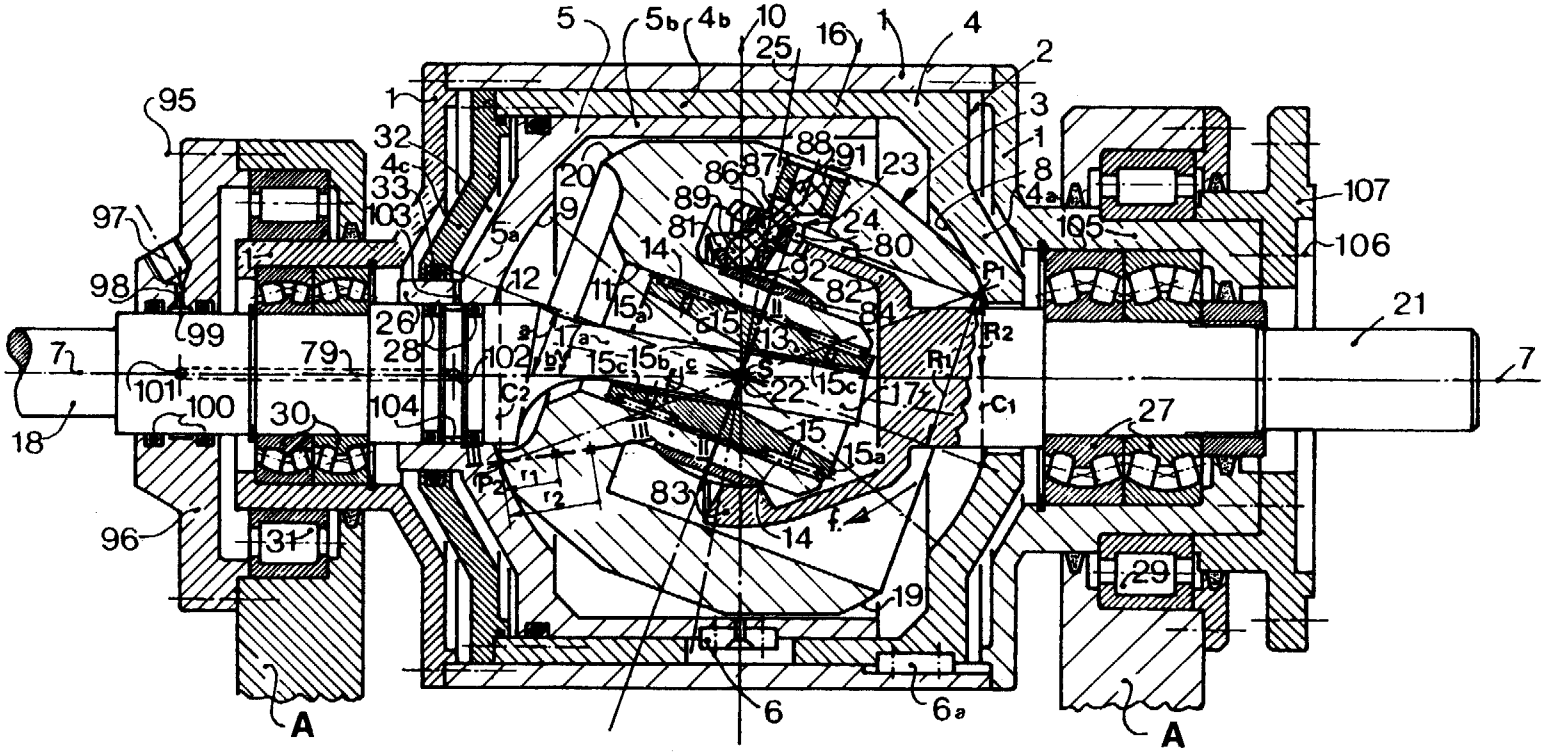
FIG. 1 is an axial sectional view of a mechanical friction speed variator device whose rotating inner element is in the meridian position.

The speed variator according to the invention shown in FIG. 1 comprises a frame A on which is mounted, through rolling bearings 29, 31, a housing 1 in which are disposed two elements 2 and 3 which are drivingly coupled together by friction.

The element 2, or shell, of revolution about an axis 7, is keyed at 6a to the housing 1 and is constituted by two hollow half-shells 4, 5 which are keyed together at 6 so as to be relatively movable only in the direction of the general axis 7 of the speed variator. The half-shells 4, 5 each have a concave inner friction surface 8, 9 which is adapted to cooperate with the element 3, or block, which is of revolution about an axis 12 which makes an angle a with the axis 7. The two friction surfaces 8, 9 are identical and symmetrical with respect to a point S on the axis 7 and on the axis 12 and with respect to a plane 10 perpendicular to the axis 7 and intersecting the point S. This plane 10 is fixed so that the half-shells 4, 5 must move symmetrically with respect thereto.

The block 3, which is one piece and is disposed in the inner space defined by the two half-shells 4, 5, has a cylindrical bore 11 having an axis 12 which constitutes the outer race for two ring arrangements of needles 14, the inner race being formed in the cylindrical surface of a support 13 having an axis 12 so that this support 13 and the block 3 are relatively rotatable on the axis 12.

Figure 2:
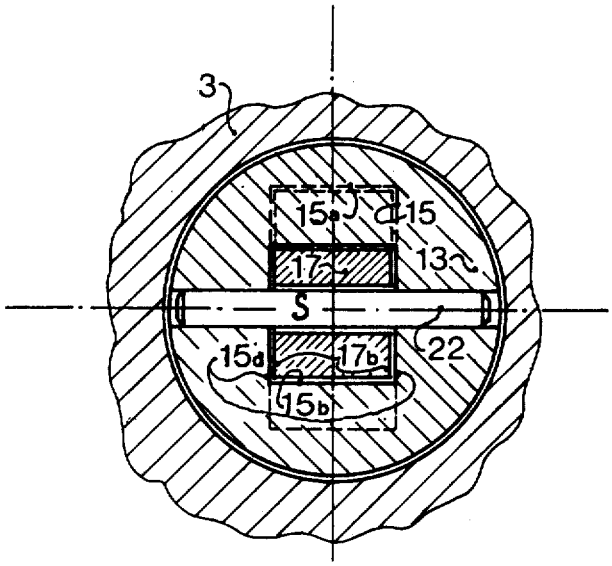
FIG. 2 is a sectional view taken on line II—II of FIG. 1.

As shown in FIGS. 1 and 2, the support 13 has a bore 15 which has a double divergence and is coaxial with the axis 12 and symmetrical with respect to the point S.

Each divergent half-bore of the bore 15 has the shape of a right prism having trapezoidal bases parallel to the meridian plane defined by the axes 7 and 12 whose largest end section 15a is rectangular and located on one end of the support 13 and whose other smaller end section 15b is also rectangular and located in the plane 16 which passes through the point S and is perpendicular to the axis 12.

The small section 15b common to the two parts of the bore 15 has extending therethrough the prismatic extension 17, for example of square section, of a shaft 18 having an axis 7 and journalled in the housing 1 through a rolling bearing 30.

The extension 17 is inclined with respect to the axis 7. Its axis 17a passes through the point S and makes with the axis 7 an angle b. In FIG. 1, the axis 17a has been shown in the plane of the Figure but when the shaft 18 rotates, it describes a cone having an apex S whose apex angle is 2b.

The support 13 is connected to the extension 17 by a pin whose axis 22 passes through the point S and is perpendicular to the axes 7 and 12. The pin of axis 22 is for example integral with the extension 17 and is freely rotatable in the support 13. Its function is to center the support 13 on the point S.

The support 13 and the block 3 may therefore pivot about the axis 22 of the pin so that the angle a made by the axes 7 and 12 may vary between a maximum value and zero. To mention just one case by way of example, the maximum value b+c of the angle a in the case of pivoting in the direction of the arrow f in FIG. 1, is defined by the contact of two surfaces 15c of the respective half-bores of the support 13, inclined at angle c with respect to the axis 12 but parallel to each other, with corresponding surfaces of the prism 17.

The driving of the support 13 by the extension 17 and vice-versa occurs not through the pin of axis 22 but through parallel surfaces 15d, 17b in mutual contact of the bore 15 of the support 13 and of the extension 17, as shown in FIG. 2.

In order to cooperate with the inner concave friction surfaces 8 and 9 of the shell 2, the block 3 has at its respective ends two outer convex friction surfaces 19, 20 which are of revolution about the axis 12 and symmetrical with respect to the plane 16.

The surfaces 19, 20 of the block 3 respectively cooperate with the surfaces 8, 9 of the shell 2 at two points P1, P2 which describe, on one hand, on the surfaces 19, 20 in the course of relative movement of the elements 2, 3, two circles having an axis 12 and equal radii R1 which are symmetrical with respect to the plane 16, and, on the other hand, on the surfaces 8, 9 two other circles C1, C2 having an axis [12] 7 and equal radii R2 which are symmetrical with respect to the plane 10.

In a general way in the present description and in the claims, these radii R1 and R2 will be defined as radii of giration respectively of the first element 3 about its axis 12 and of the element 2 about its axis 7 irrespective of the position of the points P1, P2 along meridian lines defined by the intersection of the meridian plane containing the axes 12 and 7 with the surfaces 8, 9 and 19, 20. The variation in the ratio of the radius R1 to the radius R2 achieved by any means permits the variation in the ratio of the angular velocities of the element 3 about its axis 12 to that of the element 2 about its axis 7.

According to a particular embodiment, the surfaces 19, 20 have, in meridian section, a circular profile having a constant [meidian] *meridian* radius r1 so as to constitute tori, whereas the surfaces 8, 9, also in meridian section, have a profile whose meridian radius of curvature r2 decreases in the direction away from the axis 7 so as to constitute surfaces having a toric appearance.

In a general way in the present description and in the claims, the expression "toric appearance" characterizes surfaces of revolution having a variable meridian radius of curvature r1 or r2.

The rotation of the block 3 about its axis 12 is coupled to that of a shaft 21 of axis 7 which is journalled in the housing 1 through a rolling bearing 27 on the opposite side to the shaft 18 and coaxial with the shaft 18. The connection between the shaft 21 and the block 3 is through a homokinetic joint 23 of the Rzeppa type which conforms basically to the structure disclosed in U.S. Pat. No. 2,902,844 but is modified so as to be adapted to the present structure. It comprises rollers 24 engaged in grooves 80, 81 respectively formed in the mass of the block 3 and in the extension 82 in the form of a bell or drum of the shaft 21 which is also provided with a concave spherical ring 83 in sliding contact with a convex spherical ring 84 which is attached or formed on the center part of the block 3 so as to constitute a ball joint centering the block 3 with respect to the bell 82. Engaged in each roller 24 is the center part 86 constituting a ball joint of a pilot rod 87 whose spherical end portions 88, 89 are engaged in cavities having radial axes 91, 92 respectively provided in the block 3 and in the bell 82. The center of the rollers 24 is thus maintained substantially in the plane 25 bisecting the dihedral formed by the planes 10, 16.

Adjacent the shaft 18 the half-shells 4, 5 form radial walls 4c, 5a which define an annular chamber 32. The radial wall 5a terminates in a cylindrical sleeve 26 which is axially slidable on the shaft 18 with interposition of O-rings 28. The inner edge of the radial wall 4c is axially slidable on the outer surface of the sleeve 26 with interposition of an O-ring 33.

In order to modify the relative axial position of the half-shells 4, 5, that is to say, vary the angle a, mechanical, hydraulic, electromagnetic, electromechanical or other means may be employed. A hydraulic arrangement will be described by way of example.

Bolted at 95 to the frame A is cover 96 through which the shaft 18 extends and in which is formed a connection 97 for connection to a source of liquid, this connection communicating by way of a radial passage 98 formed in the cover 96 with an annular groove 99 surrounding the shaft 18 and rendered fluidtight by O-rings 100. This annular groove 99 is connected to the annular chamber 32 by way of radial passages 101, 102 and an axial passage 79 formed in the shaft 18 and through a radial passage 103 formed in the sleeve 26. The radial passages 102, 103 communicate with an annular groove 104 surrounding the shaft 18 and sealed by O-rings 28. The volume of liquid introduced in the chamber 32 from the source positively determines the relative axial position of the two half-shells 4, 5.

Adjacent the shaft 21, there is fixed by screwing at 106 to the tubular portion of the housing 1 constituting a hollow shaft 105, a flange 107 for receiving rotary motion coaxial with the axis 7.

The force required for driving by the effect of friction in the region of the points P1, P2 is produced by the gyroscopic torque which is established about the axis 22 perpendicular at S to the rotating plane of the axes 12 and 7 (arrow f) and is a function of:

the speed of rotation of the shaft 18 about the axis 7;
the speed of rotation of the block 3 about its axis 12;
the moment of inertia of the block 3 relative to its axis 12;
the moment of inertia of the block 3 relative to an axis contained in the plane 16;
the angle a.

The main moments of inertia of the block 3 are so chosen that this torque tends to pivot the block 3 and to apply it simultaneously against the two half-shells 4, 5 whose relative axial position thus defines the angular orientation of the assembly 13, 14, 3 and consequently the value of the angle a, the liquid contained in the chamber 32 constituting an incompressible liquid abutment so that the two half-shells 4, 5 cannot move apart from each other. The angle a can therefore only be varied by varying the axial position of the half-shells 4, 5 under the effect of the variation in the volume of liquid in the annular chamber 32.

In operation, in the most general case, when the three shafts 18, 21, 105–107 rotate, and with the speed of rotation of the shaft 18 about its axis 7 being termed $\dot{\alpha}$, the speed of rotation of the shaft 21 about its axis 7 being termed $\dot{\beta}$, the speed of rotation of the two half-shells 4, 5 about said axis of revolution 7 being termed $\dot{\omega}$ (identical to the speed of rotation of the housing 1–105–107 about its axis 7), the distance between each one of the two points of contact and the axis 12 of the block 3 being termed R1, the distance between each one of the two points of contact and the general axis 7 of the machine being termed R2, the general equation of the speeds is written:

$$\dot{\omega} - \dot{\alpha} + (\dot{\alpha} - \dot{\beta}) \times (R1/R2) = 0$$

the radii R1 and R2 being variable when the angle a varies.

In the very particular case where it is for example assumed that the shaft 18 is the driving shaft and the shaft 21 is the receiving shaft and that the shaft 105–107 is prevented from rotating, the shaft 18 imparts a movement of rotation about the axis 7 to the support 13 whose axis 12, which is inclined at the angle a to the axis 7, describes a cone having an apex S and an apex angle of 2a. The block 3 is subjected to the same conical movement as the support 13 but is free to rotate about its axis 12 owing to the effect of the rolling bearings 14. As it is applied automatically at the two points P1, P2 against the half-shells 4, 5 which are prevented from rotating, the block 3 is driven about its axis 12 by reaction at a speed of rotation which is different from that of the shaft 18. This speed is a function of the angle a and is transmitted through the joint 23 to the output shaft 21. In this particular case, the output speed $\dot{\beta}$ is related to the input speed $\dot{\alpha}$ by the equation:

$$\dot{\beta} = \dot{\alpha}\,(1 - R2/R1).$$

In the very special case where it is for example assumed that the shaft 18 is the driving shaft, the shaft 105–107 is the driven shaft and the shaft 21 is prevented from rotating, the shaft 18 imparts a movement of rotation about the axis 7 to the support 13 whose axis 12, which is inclined at the angle a to the axis 7, describes a cone having an apex S and an apex angle of 2a. The block 3 is subjected to the same conical movement as the support 13 but cannot rotate about its axis 12 owing to its homokinetic connection with the shaft 21 which is prevented from rotating. As it is applied at the two points P1, P2 against the two half-shells 4, 5, the block 3 drives the latter at a speed of rotation different from that of the shaft 18. This speed is a function of the angle a and is transmitted by the keying 6a to the housing 1 and therefore to its extensions 105–107. In this particular case, the output speed $\omega$ is related to the input speed $\dot{\alpha}$ by the equation:

$$\dot{\omega} = \dot{\alpha}\,(1 - R1/R2).$$

It is arranged, as shown in FIGS. 1, 4–9, to employ different categories of points of contact P1, P2 and shapes of surfaces of revolution 19, 20 of the first element 3 and surfaces 8, 9 of the second element 2 adapted to the different envisaged applications.

Figure 4:
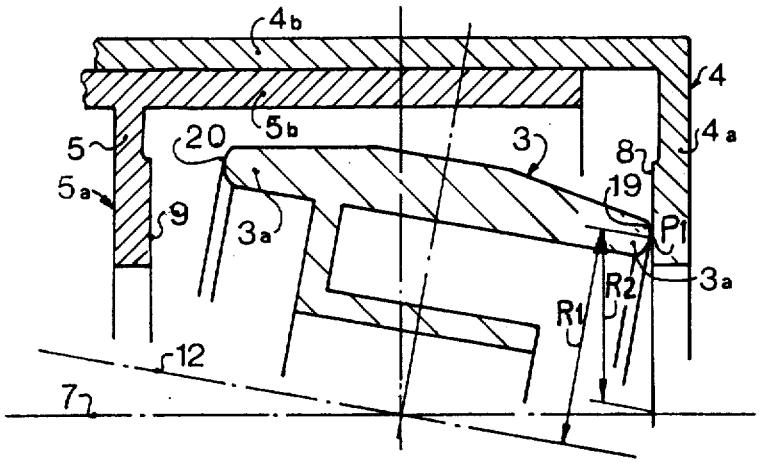
FIGS. 4 and 5 are partial axial sectional views of friction surfaces which are modifications of those shown in FIG. 1.
Figure 5:
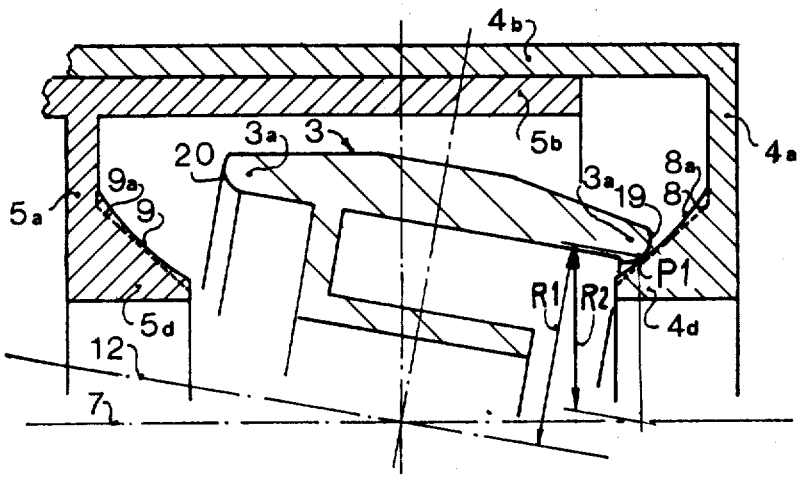

The two points of contact P1, P2 can indeed be such that R1 exceeds R2, as shown in FIGS. 1, 4 and 5, so that the gyroscopic torque tends to move the two parts 4, 5 of the element 2 away from each other, or such that R1 is less than R2, as shown in FIGS. 6 to 9, so that the gyroscopic torque tends to move the parts 4, 5 of the element 2 towards each other, the choice of one or the other of these categories of contact points moreover resulting in different ranges of speed variations for the same amplitudes of variation of the ratio R1 to R2 and in devices having different overall sizes.

Figure 3:
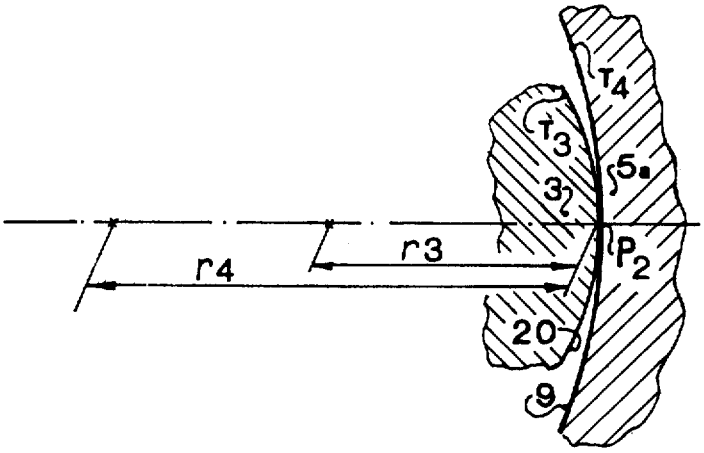
FIG. 3 is a sectional view taken on line III—III of FIG. 1.

The choice of possible different forms for the friction surfaces 8, 9 and 19, 20 of the two contacting elements 2 and 3 results in different laws of evolution of the power as a function of the output speed variation range and in different performance levels as to efficiency which permits an adaptation of the speed variator to each particular application. The shapes of these four friction surfaces, identical in pairs, may be characterized in accordance with the known Hertz theory by the examination, in respect of each considered surface, of the magnitudes and signs of two radii of curvature termed main radii and defined at the considered point of contact in two perpendicular planes passing through this point of contact. The first of these planes in meridian, that is to say, it passes through the axis of revolution of the considered surface so as to define the meridian radii of curvature at the point of (r1 and r2 respectively for the surfaces 19, 20, on one hand, and 8, 9, on the other hand, as shown in FIG. 1). The second of these planes is perpendicular to the former and contains the normal common to the two surfaces at the point of contact (line III—III in FIG. 1) and permits the definition of the transverse radii of curvature at the point of contact (r3 and r4 respectively for the surfaces 19, 20, on one hand, and 8, 9, on the other hand, as shown in FIG. 3). The negative signs are assigned to the radii of curvature corresponding to a concave surface line in the considered plane, the positive signs to the radii of curvature corresponding to a convex surface line in the considered plane. By way of example, in FIG. 1, as the meridian line of 19 and 20 is convex, r1 is positive and as the meridian line of 8 and 9 is concave, r2 is negative. In FIG. 3 as in the transverse perpendicular plane the transverse line T3 is convex, r3 is positive and as the transverse line T is concave, r4 is negative. In this particular case, the surfaces 19, 20, characterized by r1, r3 positive, are said to be convex-convex and the surfaces 8, 9, characterized by r2 and r4 negative, are said to be concave-concave, these main radii having to satisfy the two conditions r1 $<$ r2 and r3 $<$ r4. It is envisaged in the device according to the invention to employ all the shapes of the friction surfaces 8, 9 and 19, 20 generated by positive, negative or infinite values of any one between the four main radii of curvature r1, r2, r3, r4. Certain particular cases of the shape of these friction surfaces are shown in FIGS. 4 to 9.

In FIG. 4, the friction surfaces 8, 9 formed on the radii portions 4a, 5a are planar ($r2 = \infty$, $r4 = \infty$), whereas the friction surfaces 19, 20 of the block 3 which are, as in FIG. 1, convex-convex ($r1 > 0$, $r3 > 0$) are formed on end ridges 3a of toric profile.

In FIG. 5, the friction surfaces 8, 9 of the half-shells 4, 5 are concave-convex ($r2 < 0$, $r4 > 0$) and are formed on the outer surfaces of axial bosses 4d, 5d which extend from the radial portions 4a, 5a inside the block 3 at the ends of the latter which is hollowed out for this purpose while receiving the contact of the ridges 3a.

In FIGS. 6 to 9, in which R1 $<$ R2, the surfaces of revolution 8, 9 are formed on annular portions 4e, 5e which are connected to the inner surface of cylindrical portions 4b, 5b of the parts 4, 5 of the element 2. Corelatively, the surfaces of revolution 19, 20 are formed on toric ridges 3a provided at the axial ends of two flanges 3b which have a generally cylindrical shape and extend inwardly, in facing relation, from the ends of the element 3. In this case, as shown in FIGS. 6 to 9, to define the value of the ratio R1/R2 a hydraulic abutment is provided by the chamber 32, supplied with liquid and defined between the two annular relatively slidable portions 4e, 5e so as to fix the relative axial position to which the two parts 4, 5 of the element 2 are brought under the thrust exerted by the ridges 3a of the element 3.

Figure 6:
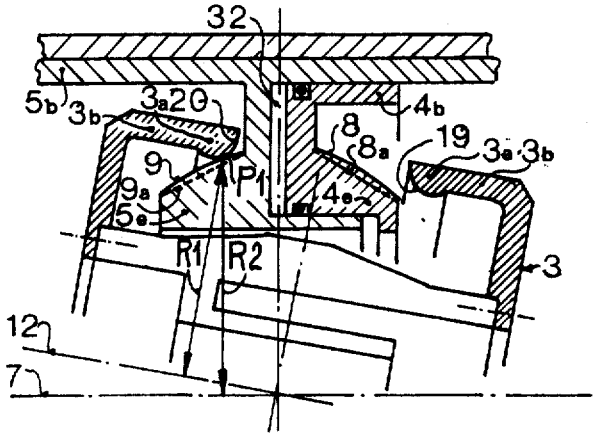
FIGS. 6, 7, 8 and 9 are partial axial sectional views of various friction surfaces of a type different from those shown in FIGS. 1, 4 and 5.

In FIG. 6, each of the friction surfaces 8, 9 is convex-convex ($r2 > 0$, $r4 > 0$) whereas the friction surfaces 19, 20 are convex-concave ($r1 > 0$, $r3 - 0$).

Figure 7:
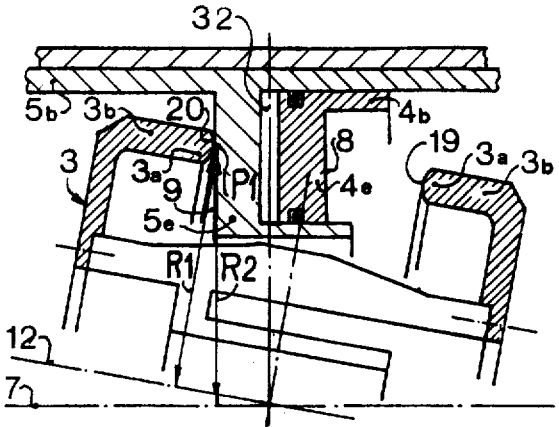

In FIG. 7, the friction surfaces 8, 9 are planar ($r2 = \infty$, $r4 = \infty$) and the friction surfaces 19, 20 are convex-convex ($r1 > 0$, $r3 > 0$).

Figure 8:
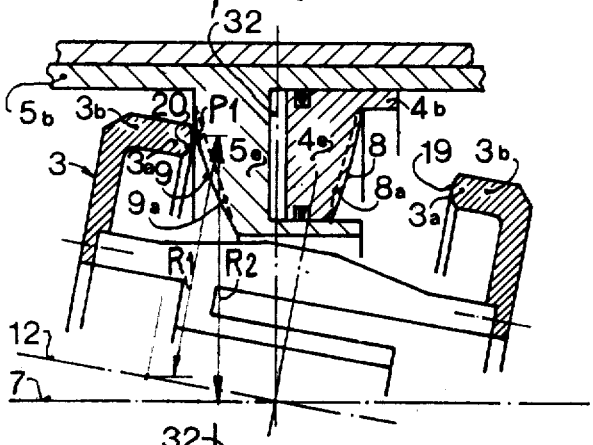

In FIG. 8, the friction surfaces 8, 9 are convex-concave ($r2 > 0$, $r4 < 0$) and the friction surfaces 19, 20 are convex-convex ($r1 > 0$, $r3 > 0$).

Figure 9:
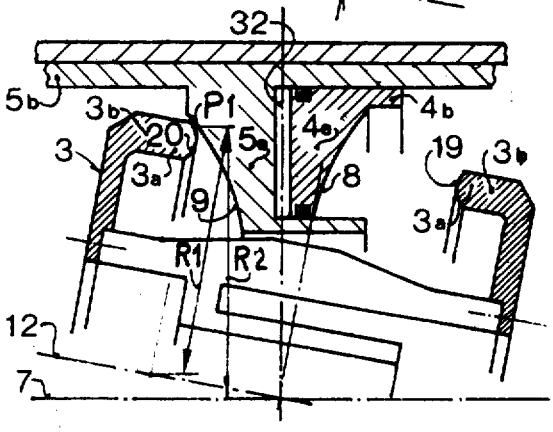

In FIG. 9, the friction surfaces 8, 9 are concave-concave ($r2 < 0$, $r4 < 0$) and the friction surfaces 19, 20 are convex-convex ($r1 < 0$, $r3 < 0$).

It will be understood that in all cases where the friction surfaces 8, 9 of the second element are not planar (FIG. 1, FIG. 5, FIG. 6, FIG. 8, FIG. 9), it is possible to substitute for the toric profiles or profiles having a toric appearance which have been illustrated a conical profile as indicated in dotted line (8a,9a) in the Figures.

By analogy with a conventional planetary train, which has gears or does not have gears, defined by three main elements, central sun, ring sun, planet carrier carrying one or more planets each of these three main elements assuming either an input function (driving) or an output function (receiving) or a reaction function (element controlled as concerns its rotation, coupled or not coupled with at least one of the two others or prevented from rotating), the device according to the invention has three shafts 105, 18, and 21 which is connected to rotate with the element 3, and these three shafts constitute three elements each of which elements is capable of assuming one of the three planetary functions, the remaining two functions being each assumed by one or the other of the two remaining shafts. In particular, in the case where the function of reaction consists in controlling as concerns rotation the element which assumes this function, this control may be achieved for example by a coupling to rotate with one and/or the other of the two remaining elements.

It may consequently be provided in the device according to the invention to couple any one of the three shafts 105, 21, 18 either with either of the other shafts (FIGS. 10 and 11) or with the other two shafts (FIG. 12) by coupling means which may be constituted, for example, by planet trains which may have gears or not.

Figure 10:
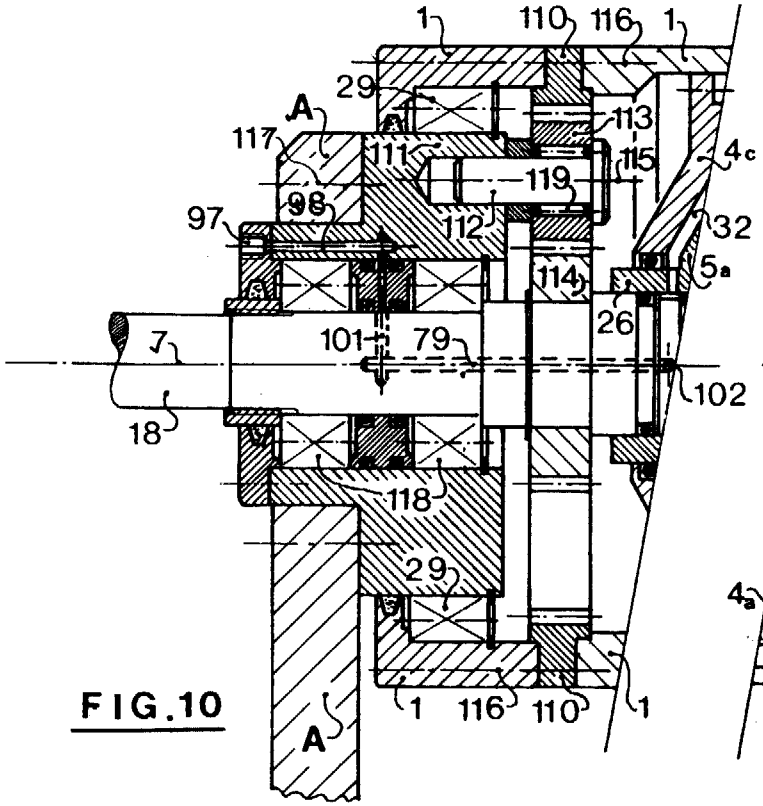

FIG. 10 shows the partial meridian section of the device shown in FIG. 1 in which there is provided a coupling as concerns rotation between the coaxial shafts 1-105-107 and 18 so that the angular velocities of these two shafts are in a constant given ratio whatever the value of R1/R2 be. For this purpose, the shaft 18 having the axis 7 is freely journalled in an annular member 111 having an axis 7, connected at 117 to the frame A and therefore prevented from rotating, through rolling bearings 118. The housing 1-105-107 is mounted to freely rotate about the axis 7 by the provision of rolling bearings 29 carried by the annular member 111 integral with the frame A. The rotating housing 1-105-107 is connected to rotate about the axis 7 through 116 with an annular member 110 having an axis 7 which carries on its inner part gear teeth and constitutes the ring gear of the coupling planetary train.

The shafts 18 of axis 7 is connected to rotate with a plate 114 which carries on its periphery gear teeth constituting the center sun gear of the coupling planetary train. The sun gear 114 and the ring sun gear 110 are coupled through one or more planet gears 113 which freely rotate with respect to their shafts 112 of axis 115 owing to provision of rolling bearings 119, for example needle bearings. The shafts 112 are integral with the annular member 111 which performs the function of planet gear carrier and is prevented from rotating. The shafts 105 and 21 (not shown) remain arranged and accessible as shown in the right part of FIG. 1. The control of the axial position of the two parts 4, 5 of the element 2 is achieved, for example hydraulically as in the embodiment shown in FIG. 1, through the connection 97 leading to a source of liquid.

Figure 11:
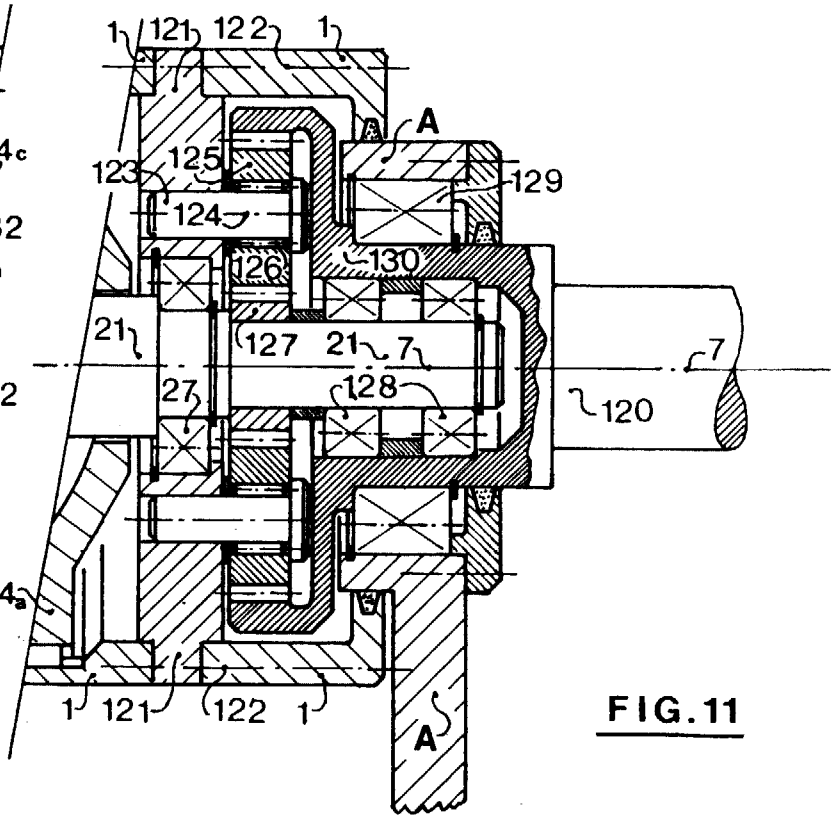
FIGS. 10 and 11 are partial axial sectional views of speed variators having three shafts between two of which there is provided a rotary coupling by means of planetary gear trains with a constant ratio in FIG. 10 and a variable ratio in FIG. 11.

FIG. 11 is a partial meridian sectional view of the device shown in FIG. 1 in which there has been provided a coupling as concerns rotation between the rotating housing 1 and the coaxial shaft 21 permitting variation of the ratio of the angular velocities of these two elements when R1/R2 varies. In this particular case, the two elements 1 and 2 are coupled through a planet gear train so as to constitute a fourth shaft 120 of axis 7 performing an input or output function. The shaft 21 is then no longer accessible directly from the exterior as in FIG. 1, there remaining only the shaft 18, as on the unchanged left part of FIG. 1, and the shaft 120 which are coaxial and share the functions of input or output and vice-versa.

The housing 1 is freely rotatable about its axis 7 through rolling bearings 27 carried by the shaft 21 of axis 7, as in FIG. 1, and through an annular member 121 connected to rotate with the housing 1 through 122, this annular member 121 constituting the planet gear carrier of the coupling planetary train. The shaft 21 is connected to rotate with a plate 127 which carries on its periphery gear teeth which mesh with gear teeth of one or more planet gears 125 which have axis 124 and are freely rotatable relative to their shaft 123 owning to the provision of rolling bearings 126, for example needle bearings. The shafts 123 of these planet gears are integral with the rotating annular member 121. The shaft 120 is extended by a sleeve 130 which is journalled in the frame A through rolling bearings 129 and rotatably mounted on the shaft 21 by rolling bearings 128, the extension of the sleeve 130 having axis 7 carrying in its inner surface gear teeth which mesh with gear teeth of the planet gear or gears 125.

Figure 12:
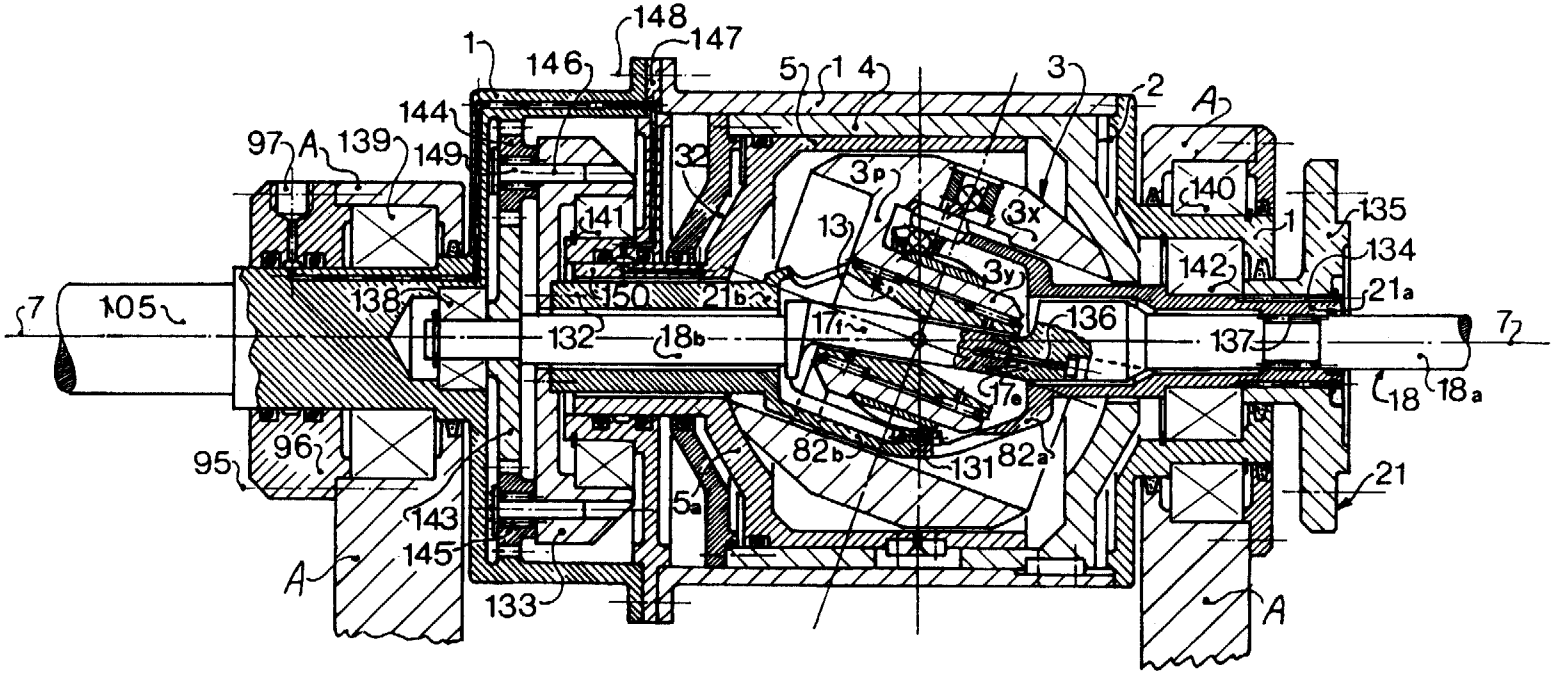
FIG. 12 is an axial sectional view of a speed variator whose three shafts are coupled to rotate through a planetary gear train.

FIG. 12 shows a new arrangement of the speed variator shown in FIG. 1 in which the three shafts 105, 21 and 18 are coupled to rotate with three elements constituting a planetary gear train while remaining directly accessible from the exterior so as to each assume one of the three planetary functions of input, output or reaction. For this purpose, the device according to the invention has a block 3 arranged to permit the passage therethrough of the shafts 18 and 21. The block 3 has a web 3p constituted by a number of radial arms whereby it is possible to connect its outer part 3x to its inner part 3y. The shaft 21 having axis 7 comprises two parts, 21a and 21b, extending by two bells 82a and 82b constituted partly by arms passing between the radial arms of the web 3p, said two bells being integral with each other at 131. The part 21a of the shaft 21 is connected through gears 134 to rotate with an output flange 135 having axis 7 which is therefore accessible from the exterior as in the embodiment shown in FIG. 1. The part 21b of the shaft 21 is connected at 132 to rotate with a plate 133 having axis 7 which constitutes the planet gear carrier of the coupling planetary train. The shaft 18 having axis 7 is constituted by two parts 18a and 18b whose extensions 17e and 17f, which extend through the support 13 of the block 3, are rendered integral with each other at 136. The part 18a of the shaft 18 is accessible from the exterior as in the embodiment shown in FIG. 1. The part 18b of the shaft 18 is connected to rotate with a plate 143 having axis 7 which has on its periphery gear teeth so as to constitute the center sun gear of the planetary gear train. The centre sun gear 143 meshes with one or more planet gears 144 having axis 146 and freely rotatably mounted on their shafts 149 by rolling bearings 145, for example needle bearings. The shafts 149 of these planet gears are integral with the planet gear carrier 133. These planet gears mesh with gear teeth formed on the inner surface of the housing 1 so as to constitute the outer sun gear of the planetary gear train. The housing 1-105 is mounted to rotate freely about its axis 7 in the frame A through rolling bearings 139 and 140. The shaft 21 is mounted to rotate freely about its axis 7, on one hand, by its extension 133 through the rolling bearing 141 in the extension 147 which is connected at 148 to rotate with the housing 1 and, on the other hand, in the housing 1 through the rolling bearing 142. The shaft 18 is freely rotatable about its axis 7 in the shaft 105 through the rolling bearing 138 and in the part 21a of the shaft 21 through a needle bearing 137.

The control of the axial portion of the parts 4, 5 of the element 2 is ensured hydraulically by the supply or withdrawal of liquid in the annular chamber 32 through a branch connection 97 then through a series of passages which lead from this connection to the chamber 32 through the housing 1 and then through its extension 147 and finally through the cylindrical extension 150 of the part 5 of the element 2.

Figure 13:
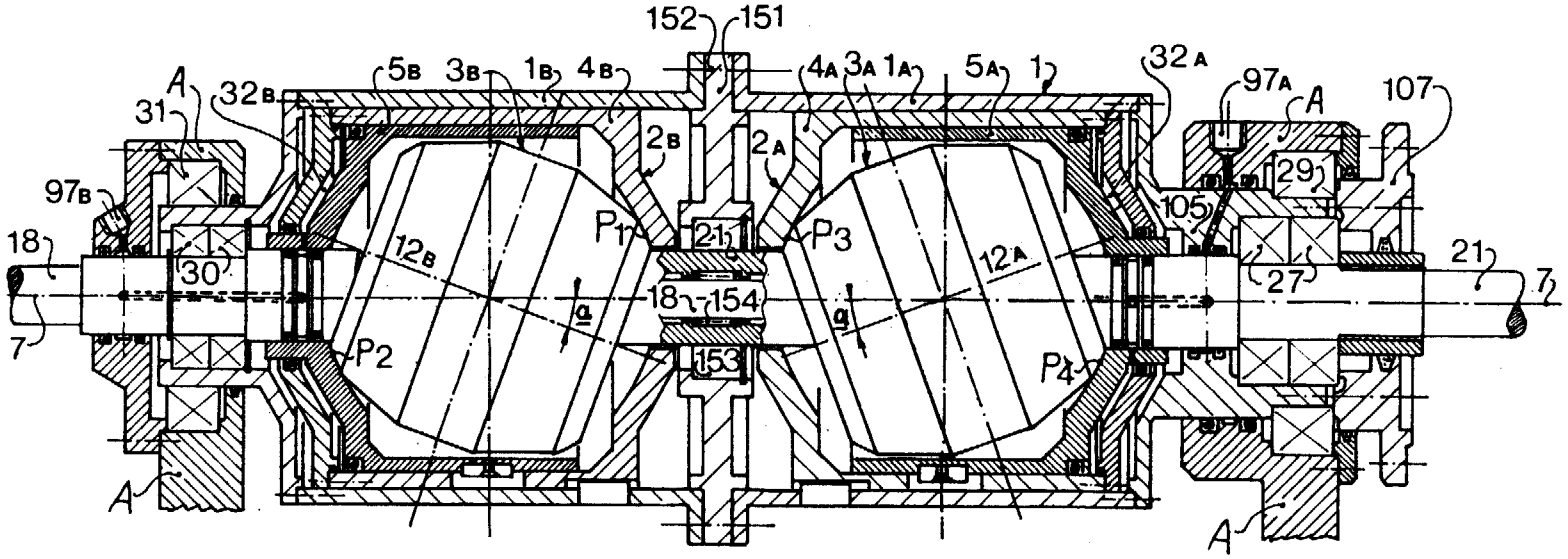
FIG. 13 is an axial sectional view of a transmission mechanism having two speed variators.

FIG. 13 is an axial sectional view of a transmission mechanism constituted by two transmission devices of the type shown in FIG. 1 and having the same general axis 7 and mounted one after the other along this general axis, their three shafts 105, 21, 18 being common and arranged in such manner that the gyroscopic torques, which permit the transmission of power between the elements 3A, 2A, on one hand, and 3B, 2B, on the other, and are transmitted through the element 2A and 2B to the frame A, are opposite and substantially equal.

For this purpose, the transmission mechanism is constituted by two speed variators according to the invention having a common housing 1 by the connection at 152 of two housings 1A and 1B, which common housing is extended as in FIG. 1 by a shaft 105 integral with an output flange 107 accessible from the exterior of the mechanism. This housing 1-105-107 is mounted to be freely rotatable about its axis 7, at its ends, in the frame A by two rolling bearings 31 and 29 as in the case of the embodiment shown in FIG. 1 and, at its center, about the shaft 21 common to the two speed variators through a rolling bearing 153 and an annular member 151 having axis 7 integral at 152 with the housing 1. The shaft 18 having axis 7 extends through the support of the block 3B, as shown in FIG. 12, and terminates in an inclined extension in the block 3A, as shown in FIG. 1. This shaft 18, accessible from the exterior as in the embodiment shown in FIG. 1, is mounted to be freely rotatable about its axis 7, on one hand, in the housing 1 by rolling bearings 30 as is the embodiment shown in FIG. 1 and, on the other hand, in the hollow shaft 21 in the center of the mechanism, by needle bearings 154.

The shaft 21 having axis 7 which constitutes, first, in the center of the mechanism, a hollow output or input shaft of the homokinetic joint of the block 3B, extends through the block 3A as shown in FIG. 12 and terminates in a solid shaft 21 accessible from the exterior as in the embodiment shown in FIG. 1. This shaft 21 is mounted to be freely rotatable with respect to the shaft 18 and housing 1 about its axis 7, on one hand, in the center of the mechanism, by rolling bearings 154 and 153 and, on the other hand, at its free end in the housing 1-105-107 by rolling bearings 27.

The two speed variators arranged in this way operate in parallel and not in series. The four points of contact, namely P1 and P2 between the block 3B and the parts 4B and 5B of the element 2B and P3 and P4 between the block 3A and the parts 4A and 5A of the element 2A each transmitting one quarter of the power transmitted.

The stimultaneous control of the variation in the speed, ensured hydraulically thrugh the orifices 97A and 97B to the annular chambers 32A and 32B, is so designed that the blocks 3A and 3B having axes 12A and 12B are inclined in opposition at the same angle a to the axis 7. The transmission mechanism thus arranged consequently has three coaxial shafts 105, 21, 18 each of which shafts may perform, as in the speed variator shown in FIG. 1, one of the input, output and reaction functions, the remaining two shafts performing the remaining two functions.

Having now described my invention, what I claim as new and desire to secure by Letters Patent is:

1. A power transmission comprising, a first element comprising two axially spaced closed surfaces of revolution about a first axis defining two rolling surfaces on opposite sides of a plane normal to said first axis and passing through a point on said first axis, a second element driven conically about said point on the first axis and circumferentially of said first axis, said second element having two second rolling closed surfaces of revolution about a second axis and axially spaced on opposite sides of a plane passing through said point and normal to said second axis, said second axis intersecting said first axis at said point and being inclined to the first axis by an angle a, input torque means comprising a first shaft to impart conical movement to said second element conically about said point on the first axis and circumferentially of said first axis, said second element having means effective to develop gyroscopically when driven a gyroscopic torque effective for applying said rolling surfaces on each other for relative rolling thereon and contacting at two areas disposed on opposite sides of both axes and effective to couple said first and second element, to prevent a sliding movement therebetween, *the forces applying said rolling surfaces on each other consisting essentially of forces mechanically applied to said first and second elements, said mechanically applied forces including said gyroscopic torque,* and means comprising a second shaft connected for taking out an output torque transmitted through said element from said input torque means.

2. A power transmission recording to claim 1, in which said input torque means to impart conical movement to said second element includes means mounting said second element for rotation around the second axis.

3. A power transmission according to claim 2, in which the center of gravity of said second element is disposed at a point of intersection of said first axis and said second axis.

4. A power transmission according to claim 2 including a stationary frame mounting said first and second element, and said point of intersection being disposed stationary axially relative to said frame.

5. A power transmission according to claim 3, in which said first element comprises two parts each defining thereon a corresponding rolling surface of the first element and effective to vary the relative speed between the first shaft and said second shaft in dependence upon the position of said two areas relative to the axis, means joining the two parts for joint rotation and for allowing relative axial movement to vary the position of the rolling surfaces thereof to the first axis, and means to vary the axial position of said two parts relative to said first axis.

6. A power transmission according to claim 5, in which said means to vary the axial position of said two parts relative to said first axis comprises means defining a fluid chamber in conjunction with said two parts for receiving fluid under pressure therein for moving said two parts axially relatively.

7. A power transmission according to claim 2, in which said surfaces of revolution about said first axis are disposed symmetrically relative to said plane normal to said first axis, and said surfaces of revolution about said second axis are disposed symmetrically relative to said plane normal to said second axis.

8. A power transmission according to claim 7, including means comprising said first element and said second element to vary the relative speed between the first shaft and the second shaft as a function of the position of said areas relative to the axis.

9. A power transmission according to claim 1, in which said input torque means to impart conical movement to said second element comprises a support element mounting said second element for rotation around the second axis, means mounting the support element for rotation with said first shaft, and means on the first-mentioned means for mounting said support element for tilting about a pivot axis disposed at said point perpendicular to the first and second axis.

10. A power transmission according to claim 9, in which said means mounting the support element for rotation with said first shaft comprises an axial extension on said first shaft, and said pivot axis being disposed on said extension.

11. A power transmission according to claim 10, in which said extension is offset from said first axis.

12. A power transmission according to claim 10, in which said support element comprises a longitudinal prismatic bore having a longitudinal axis corresponding to said second axis and having opposite sides each diverging from said point and lateral opposed flat sides parallel to first and second axis, said extension having opposite flat sides substantially abutting corresponding flat sides of said prismatic bore for relative sliding movement therebetween.

13. A power transmission according to claim 1, in which said input torque means to impart conical movement to said second element includes means mounting said second element for rotation around the second axis, and including means mounting said first element for rotation around the first axis.

14. A power transmission comprising, a first element comprising two axially spaced closed surfaces of revolution about a first axis defining two rolling surfaces on opposite sides of a plane normal to said first axis and passing through a point on said first axis, a second element driven conically about said point on the first axis and circumferentially of said first axis, said second element having two second rolling closed surfaces of revolution about a second axis and axially spaced on opposite sides of a plane passing through said point and normal to said second axis, said second axis intersecting said first axis at said point and being inclined to the first axis by an angle a, means comprising a first shaft to impart conical movement to said second element conically about said point on the first axis and circumferentially of said first axis, said second element having means effective to develop gyroscopically when driven a gyroscopic torque effective for applying said rolling surfaces on each other for relative rolling thereon and contacting at two areas disposed on opposite sides of both axis and effective to couple said first and second element to prevent a sliding movement therebetween, said means to impart conical movement to said second element including means mounting said second element for rotation around the second axis, means mounting said first element for rotation around the first axis, a second shaft connected to said second element for rotation therewith upon rotation thereof about said second axis, a third shaft connected to said first element for rotation therewith, one of said first, second and third shafts constituting an input shaft and another of said second and third shafts constituting an output shaft, means connecting at least two of the first, second and third shafts for correlating the relative speeds of the three shafts.

15. A power transmission comprising a first element comprising two axially spaced closed surfaces of revolution about a first axis defining two rolling surfaces on opposite sides of a plane normal to said first axis and passing through a point on said first axis, a second element driven conically about said point on the first axis and circumferentially of said first axis, said second element having two second rolling closed surfaces of revolution about a second axis and axially spaced on opposite sides of a plane passing through said point and normal to said second axis, said second axis intersecting said first axis at said point and being inclined to the first axis by an angle a, input torque means comprising a first shaft to impart conical movement to said second element conically about said point on the first axis and circumferentially of said first axis, said second element having means effective to develop gyroscopically when driven a gyroscopic torque effective for applying said rolling surfaces on each other for relative rolling thereon and contacting at two areas disposed on opposite sides of both axis and effective to couple said first and second element to prevent a sliding movement therebetween, means comprising a second shaft connected for taking out an output torque transmitted through said second element from said input torque means, and compensating means to compensate for the gyroscopic torque developed by said second element.

16. A power transmission according to claim 15, in which said compensating means comprises means developing a second gyroscopic torque of opposite direction to the first-mentioned gyroscopic torque.

*17. A power transmission comprising a first element comprising two axially spaced closed surfaces of revolution about a first axis defining two rolling surfaces on opposite sides of a plane normal to said first axis and passing through a point on said first axis, a second element conically revolvable about said point on said first axis and circumferentially of said first axis, said second element having two rolling closed surfaces of revolution about a second axis and axially spaced on opposite sides of a plane passing through said point and normal to said second axis, said second axis intersecting said first axis at said point and being inclined at an angle with respect to said first axis, said second element having means effective to develop gyroscopically when revolved, a gyroscopic torque effective for applying said rolling surfaces on each other for relative rolling thereon and contacting at two areas disposed on opposite sides of both of said axes and effective to couple said first and second element, the forces applying said rolling surfaces on each other consisting essentially of forces mechanically applied to said first and second element, said mechanically applied forces including said gyroscopic torque.*

*18. A power transmission as recited in claim 17 including mechanical means to develop a driving torque at the rolling surfaces of one of said elements to be transmitted as a driven torque from the rolling surfaces of the other of said elements.*

* * * * *